May 1, 1956 L. W. YOUNGSTROM ET AL 2,743,460
ADJUSTABLE CONNECTOR FOR TANK AND BOWL OF
A CLOSE COUPLED WATER-CLOSET COMBINATION
Filed Aug. 3, 1953
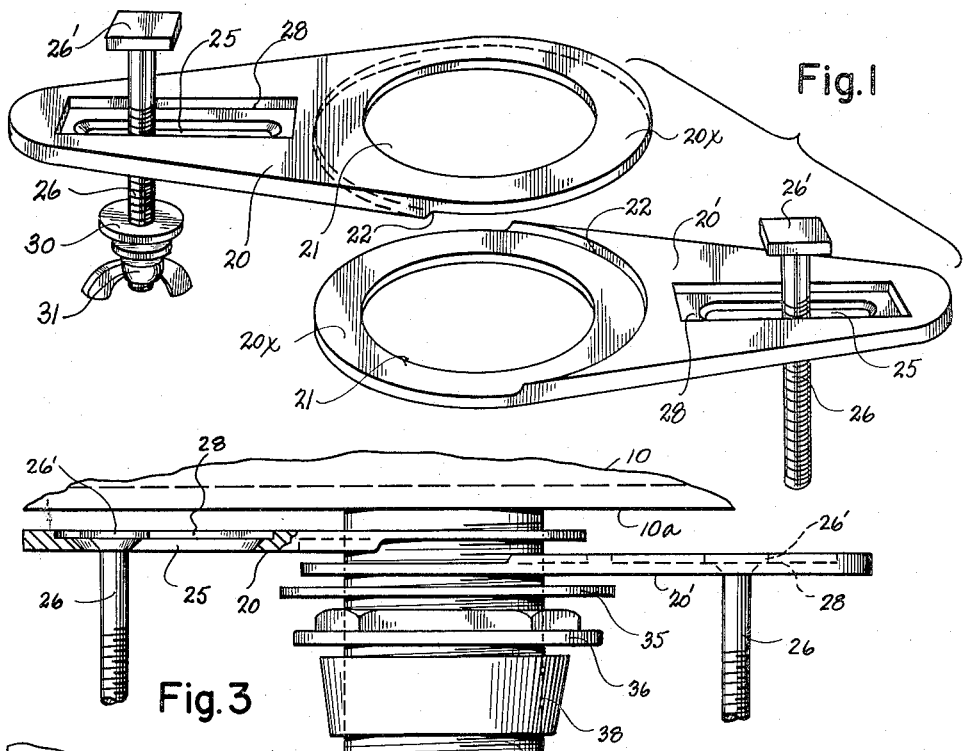
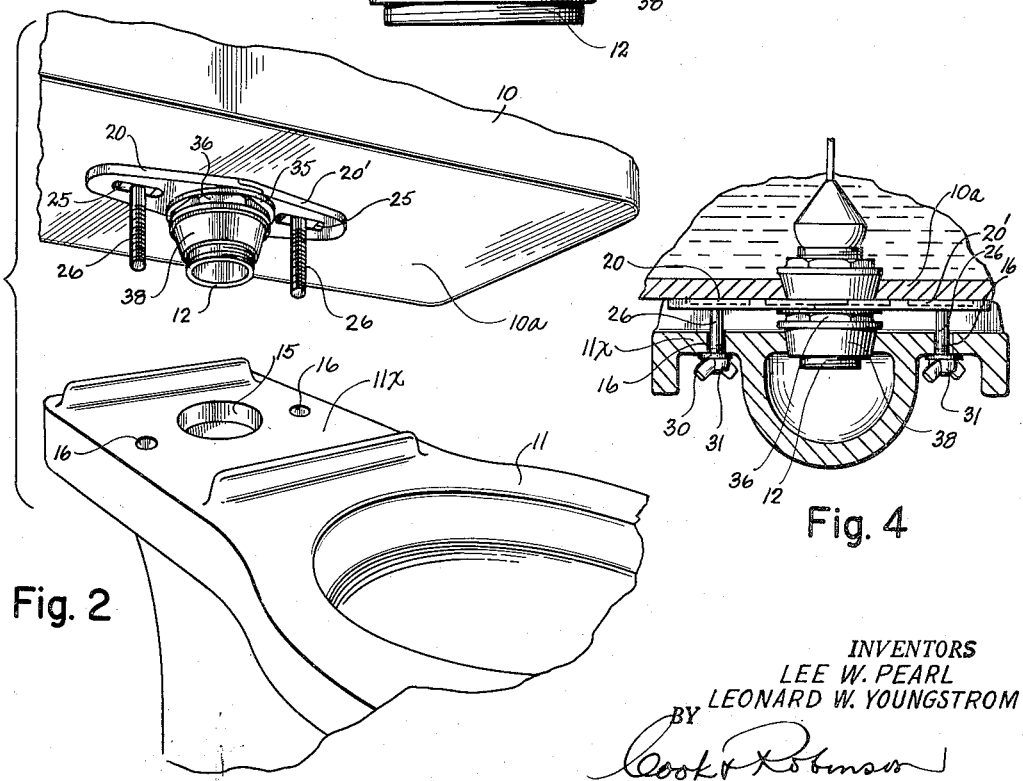
INVENTORS
LEE W. PEARL
LEONARD W. YOUNGSTROM
BY
ATTORNEYS

United States Patent Office 2,743,460
Patented May 1, 1956

2,743,460

ADJUSTABLE CONNECTOR FOR TANK AND BOWL OF A CLOSE COUPLED WATER-CLOSET COMBINATION

Leonard W. Youngstrom and Lee W. Pearl, Seattle, Wash.

Application August 3, 1953, Serial No. 371,967

6 Claims. (Cl. 4—68)

This invention relates to improvements in water-closet combinations, and it has reference more particularly to adjustably assembled parts whereby a rigid holding connection between the water storage tank and the bowl of a close coupled water-closet combination can be easily and readily effected.

To impart a better understanding of the objects and advantages of the present invention, it will here be explained that it is the usual practice in the manufacture of what in trade are known as "close coupled water-closet combinations," to design the water tanks to fit bowls of specific forms. That is, a tank is made to fit one specific bowl and may not fit any other in so far as the means for effecting their connection is concerned. After such a combination has been put into use, it may happen that one or the other of its parts becomes damaged and it becomes necessary, or desirable, that it be replaced. Styles and details of construction of such articles are frequently changed, and therefore if the original combination has been in use for a long time, it may be impossible or at least difficult to obtain a duplicate of the part to be replaced, and one of a different make or size, or one having different details of construction will have to be used. In the use of the substitute or replacement part, the holes or devices therein for accommodating the anchor bolts as applied thereto for the joining or connecting of the parts may be found not to be spaced in accordance with the spacing of the holes or devices of the complemental part and a proper connection cannot be made. Such difficulties are quite apt to occur whenever parts that were not originally designed for each other are to be assembled, and this is generally by reason of a difference in spacing or location of the anchor bolt holes as applied thereto from those of the original part.

In view of the above, it has been the primary object of this invention to provide a form of connector that may be fixedly applied to any of the present day types of water storage tanks that are designed for use in close coupled combinations, and which connector comprises parts, designed to mount the tank securing bolts therein, and which parts are easily and readily adjustable thus to accommodate the spacing and location of the anchor bolts to the particular spacing and location of the holes provided in the shelf of the supporting bowl to receive them.

More specifically stated, the present invention resides in the provision of an adjustable connector comprising a pair of plates, with ends adapted to be overlapped and to receive the lower end portion of the flush valve nipple therethrough, and to be clamped tightly together and rigidly locked to said valve nipple in various positions of radial adjustment, and in which plates, anchor bolts are mounted for any necessary adjustment in spacing and in location relative to the nipple that is required to accommodate them to the spacing and location of the anchor bolt holes provided in the tank mounting shelf of the bowl.

Further objects and advantages of the present invention reside in the details of construction and combination of parts embodied in the connector, and in their functional relationship and mode of use, as will hereinafter be fully described.

In accomplishing the above mentioned and other objects of the invention, we have provided the improved details of construction, the preferred forms of which are illustrated in the accompanying drawings, wherein:

Fig. 1 is a perspective view of the parts of the present connector shown in separated relationship.

Fig. 2 is a perspective view showing parts of the water storage tank and the bowl that are to be joined, and the parts of the present connector as applied to the flush valve nipple of the tank.

Fig. 3 is a view showing the parts of the connector applied to the flush valve nipple, but in spaced relationship for explanatory purposes.

Fig. 4 is a cross-sectional detail of the connector of this invention as applied to the tank and as secured to the bowl shelf.

Referring more in detail to the drawings:

In Fig. 2, 10 designates the lower or base portion of the water storage tank and 11 designates a portion of the bowl of a close coupled water-closet combination. The tank 10 has a horizontal bottom wall 10a through which the nipple 12 of the flush valve with which the tank is equipped extends in a downward direction, and the bowl 11 is formed with an integral, rearwardly extending, horizontal shelf portion 11x upon which the tank is to be rested for support when the parts are assembled. The shelf, as usual, is provided with a relatively large hole 15 through which the nipple 12 can be extended for delivery of water to the bowl and also is provided with smaller holes 16—16, at opposite sides and evenly spaced from hole 15, to receive the tank anchoring bolts, which generally are anchored in and extended downwardly through the bottom wall of the tank.

The connector of the present invention comprises the parts which have been shown in perspective view of Figs. 1 and 2. They comprise paired, flat and rigid metal plates 20 and 20'; each having a circularly rounded inner end portion 20x formed with a circular hole 21 of such diameter as to permit the downwardly extending nipple 12 of the flush valve to be slipped through the hole as has been shown in Fig. 3.

These inner end portions of the plates as applied to the nipple in Fig. 3, have adjacent surfaces recessed to half-thickness, as at 22, in order that when assembled on the nipple and brought flatly together, their total thickness will be equal to the thickness of the outer end portions of the plates, and the top surfaces of both plates can be engaged flatly against the bottom wall of the tank, as has been shown in Fig. 4.

The plates are somewhat tapered toward their outer ends, and each is formed lengthwise thereof with a slot 25 through which an anchor bolt 26 is extended. These bolts 26 have flat, squared heads 26' adapted to fit down within recesses or channels 28 formed in the top surfaces of the plates along the slots 25. When the bolt heads are seated in these channels, their top surfaces will be flush with the top surfaces of the plates, as shown in Fig. 3, and the bolt heads will be held by the channel side walls against turning. At their lower ends, the bolts are equipped with washers 30 applied downwardly through the plate slots 25, with their heads seated in channels 28. The plates are then slipped upwardly onto the downwardly extended nipple 12. A thin washer 35 is applied about the nipple, against the underside of the lower plate 20' and the parts are then secured against the underside of the tank by a nut 36 that is threaded onto the nipple. Before the nut is fully tightened, the plates, which extend in opposite directions laterally of their mounting, are adjusted to such position that the slots therein will register with the holes 16—16 of the bowl shelf, and the bolts 26 are adjusted along the slots to positions to permit their passing downwardly through the holes 16—16 when the tank is lowered to position. After adjustment of the plates and bolts has been made by trial, the tank can be lifted and the nut fully tightened, thus to firmly secure the plates and bolts in position. The annular and conically tapered gasket 38 is then applied about the lower end portion of the nipple 12 and is seated at its upper end against the flat lower surface of the nut 36. The tank is then set down on the bowl shelf in proper position with the nipple 12 and gasket 38 as applied thereto extended into the hole 15 and the bolts 26 projecting down through the holes 16—16 of the bowl shelf. Then the washers 30 and securing nuts 31 are applied to the bolts 26 and tightened against the underside of shelf 11x to firmly secure the tank in place and seal the connection between nipple and bowl.

It will be understood that in the event that the tank used should be one of that type provided with holes in its bottom wall for the mounting of anchor bolts, these holes must necessarily be plugged by suitable means. The tank which is shown in Fig. 2 is one known as the "flush elbow type" which does not require a bolt connection. This is the type of tank we prefer to use.

By use of a connector of the kind illustrated and described, practically any tank and any bowl can be connected rigidly and securely. The fact that the plates 20—20', as extended laterally in opposite directions from the nipple 12, can be angularly adjusted, permits them to accommodate themselves to bolt holes 16—16 that may be formed either forwardly or rearwardly of hole 15 or directly at opposite sides thereof. Furthermore, by reason of the provision of the slots 25 lengthwise of the plates, any lateral spacing of the holes 16—16, within those limits permitted by the slots can be taken care of. Therefore, by use of this connector, water tanks and bowls of different makes and styles not originally intended for use with each other can be readily and properly connected for use.

This type of connector also can be made as original equipment for tank and bowl combinations, and would eliminate the requirement for the water tank being formed with bolt receiving holes.

In conclusion, it will be here stated that in the replacement of a defective tank of a close coupled combination, it is preferred to use the flush elbow type because such tanks do not have bolt holes in the bottom which would necessarily have to be plugged.

If the bowl is the part to be replaced with the original close coupled type tank, then it becomes necessary to plug the bolt holes of the tank.

Having thus described our invention, what we claim as new therein and desire to secure by Letters Patent is:

1. In a water closet, in combination, a water tank having a flush valve nipple extended downwardly from its bottom wall, a bowl having a shelf on which said tank is supported and formed with an opening into which the said nipple extends and with anchor bolt holes spaced from the said opening, and an adjustable connector securing the tank to the bowl, said connector comprising a pair of plates, each with a hole in its inner end portion through which the nipple extends, the said plate ends being independently rotatable and disposed flatly together adjacent the bottom of the tank, bolts mounted in the outer end portions of the plates and extended downwardly through the anchor bolt holes of the said bowl shelf, a nut threaded onto the nipple and tightened against the said plates to secure them to the nipple and nuts applied to said bolts and tightened against the underside of the shelf.

2. A combination as recited in claim 1 wherein the said pair of plates are radially adjustable on the nipple relative to each other, and the said anchor bolts are mounted therein for adjustment longitudinally thereof.

3. A combination as recited in claim 1 wherein the said paired plates are longitudinally sloted and said anchor bolts are adjustable along the slots and have heads at their upper ends whereby they are anchored in said plates.

4. A combination as recited in claim 1 wherein said plates are longitudinally channeled in their top surfaces, and said channels are longitudinally slotted, and said plates are radially adjustable about the nipple to adapt the slot of each to be registered with an anchor bolt hole of the shelf, and said bolts extend through the slots and have heads seated in the channels and held thereby against turning.

5. A tank and bowl connector for use with a close coupled water-closet combination; said connector comprising a pair of flat, rigid plates, each formed with a hole through its inner end portion adapted to receive therethrough the flush valve nipple as extended downwardly from the tank bottom, and the plate end portions to be disposed flatly together and against the tank bottom; said plates being independently rotatable and longitudinally slotted, and each having an anchor bolt extended downwardly through its slot and adjustable therealong for application to an anchor bolt hole in the tank supporting shelf of the bowl, each bolt having a head whereby it is anchored in the plate slot, and a nut applied to its lower end portion for securing it in the shelf, and a nut applicable to the nipple to clamp the plates together and secure them on the nipple.

6. The combination with a tank that has a flush valve nipple extended downwardly therefrom and a bowl having a tank supporting shelf formed with an opening to receive said nipple and with anchor bolt holes spaced from the said opening at opposite sides thereof, of a connector comprising a pair of plates, each formed with a hole through its inner end portion adapting it to receive the nipple therethrough and be independently rotatable thereabout and the plate end portions to be disposed flatly together and against the bottom of the tank; and said plates having longitudinally extending slots formed therethrough, and anchor bolts applied downwardly on the nipple to dispose the slot therein in registration with the corresponding anchor bolt hole, and the bolts being adjustable along the slots for projection downwardly through the anchor bolt hole, a nut applied to the nipple and against the plates to secure them on the nipple, a tapered gasket applied to the nipple below and seated against the nut, and securing nuts applied to the lower ends of the bolts and tightened against the shelf to secure the connector thereto.

References Cited in the file of this patent
UNITED STATES PATENTS

| | | |
|---|---|---|
| 1,745,814 | Sadler | Feb. 4, 1930 |
| 2,108,625 | Tilden | Feb. 15, 1938 |
| 2,251,989 | Dean | Aug. 12, 1941 |